(12) United States Patent
Song et al.

(10) Patent No.: US 12,149,481 B2
(45) Date of Patent: Nov. 19, 2024

(54) HYBRID AUTOMATIC REPEAT REQUEST-ACKNOWLEDGEMENT (HARQ-ACK) FEEDBACK POSITION DETERMINING METHOD AND COMMUNICATIONS DEVICE

(71) Applicant: VIVO MOBILE COMMUNICATION CO., LTD., Dongguan (CN)

(72) Inventors: Yang Song, Dongguan (CN); Na Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 289 days.

(21) Appl. No.: 17/731,219

(22) Filed: Apr. 27, 2022

(65) Prior Publication Data
US 2022/0255706 A1     Aug. 11, 2022

Related U.S. Application Data

(63) Continuation of application No. PCT/CN2020/125772, filed on Nov. 2, 2020.

(30) Foreign Application Priority Data

Nov. 8, 2019   (CN) .......................... 201911090541.7

(51) Int. Cl.
*H04L 5/00*     (2006.01)
*H04L 1/18*     (2023.01)
(Continued)

(52) U.S. Cl.
CPC .......... *H04L 5/0055* (2013.01); *H04L 1/1812* (2013.01); *H04W 72/0446* (2013.01)

(58) Field of Classification Search
CPC ... H04L 5/0055; H04L 5/0057; H04L 5/0053; H04L 1/18; H04L 1/1812; H04L 1/1809;
(Continued)

(56) References Cited

U.S. PATENT DOCUMENTS

| 2019/0222366 A1 | 7/2019 | Zhang et al. |
| 2019/0312713 A1 | 10/2019 | Yang et al. |

(Continued)

FOREIGN PATENT DOCUMENTS

| CN | 110086579 A | 8/2019 |
| CN | 110086583 A | 8/2019 |

(Continued)

OTHER PUBLICATIONS

International Search Report issued in corresponding International Application No. PCT/CN2020/125772, mailed Jan. 27, 2021, 5 pages.

(Continued)

*Primary Examiner* — Phong La
(74) *Attorney, Agent, or Firm* — IPX PLLC

(57) ABSTRACT

The present disclosure provides a hybrid automatic repeat request-acknowledgement (HARQ-ACK) feedback position determining method and a communications device. The HARQ-ACK feedback position determining method includes: when a repetition scheme of a physical downlink shared channel (PDSCH) in one slot is configured or indicated, determining at least one candidate PDSCH reception occasion based on a start and length indicator (SLIV) of a time domain resource allocation (TDRA); and determining, based on the first PDSCH scheduled by using downlink control information (DCI) and the at least one candidate PDSCH reception occasion, a feedback position of an HARQ-ACK corresponding to a first PDSCH in a preset HARQ-ACK codebook, where the first PDSCH is transmitted for one or more times.

18 Claims, 9 Drawing Sheets

(51) Int. Cl.
  *H04L 1/1812* (2023.01)
  *H04W 72/04* (2023.01)
  *H04W 72/0446* (2023.01)
(58) Field of Classification Search
  CPC .... H04L 1/1822; H04L 1/1825; H04W 72/04; H04W 72/0446; H04W 72/044; H04W 72/0457; H04W 72/0453
  See application file for complete search history.

(56) References Cited

U.S. PATENT DOCUMENTS

| | | | | |
|---|---|---|---|---|
| 2020/0389897 | A1* | 12/2020 | Mondal | H04L 5/0044 |
| 2021/0014026 | A1* | 1/2021 | Papasakellariou | H04L 1/1861 |
| 2021/0143943 | A1* | 5/2021 | Zhou | H04L 5/001 |
| 2021/0234640 | A1* | 7/2021 | Cirik | H04L 1/1819 |
| 2022/0116156 | A1* | 4/2022 | Takeda | H04L 1/1861 |
| 2022/0174666 | A1* | 6/2022 | Kou | H04L 5/0012 |
| 2022/0224453 | A1* | 7/2022 | Li | H04L 1/1861 |
| 2024/0121034 | A1* | 4/2024 | Yeo | H04W 28/04 |

FOREIGN PATENT DOCUMENTS

| | | |
|---|---|---|
| CN | 110138514 A | 8/2019 |
| CN | 110324117 A | 10/2019 |

OTHER PUBLICATIONS

Samsung, "Corrections on CA operation", 3GPP TSG RAN WG1 Meeting #93 R1-1806740, May 2018.
Samsung, "Corrections on CA operation", 3GPP TSG RAN WG1 Meeting #92 R1-1801989, Mar. 2018.
First Office Action issued in related Chinese Application No. 201911090541.7, mailed Feb. 23, 2022, 8 pages.
NTT DOCOMO, Inc., "Discussions on DL SPS enhancement and UL intra-UE transmission prioritization / multiplexing", 3GPP TSG RAN WG1 #98 R1-1909199, Aug. 2019.
ZTE, "Other enhancements for rel-16 URLLC", 3GPP TSG RAN WG1 #98 R1-1908241, Aug. 2019.

* cited by examiner

HYBRID AUTOMATIC REPEAT REQUEST-ACKNOWLEDGEMENT (HARQ-ACK) FEEDBACK POSITION DETERMINING METHOD AND COMMUNICATIONS DEVICE

CROSS-REFERENCE TO RELATED APPLICATIONS

This application is a continuation of International Application No. PCT/CN2020/125772, filed Nov. 2, 2020, which claims priority to Chinese Patent Application No. 201911090541.7, filed Nov. 8, 2019. The entire contents of each of the above-referenced applications are expressly incorporated herein by reference.

TECHNICAL FIELD

The present disclosure relates to the field of communications technologies, and in particular, to a Hybrid Automatic Repeat Request-Acknowledgement (HARQ-ACK) feedback position determining method and a communications device.

BACKGROUND

Currently, a semi-static HARQ-ACK codebook is created merely for a case in which no physical downlink shared channel (PDSCH) is transmitted repeatedly in one slot, and in some cases (for example, when an HARQ-ACK is fed back by using a granularity of a sub-slot), cannot be directly applied to a scenario in which one same PDSCH is transmitted repeatedly in time domain in one slot for a plurality of times. Clarification is needed when the semi-static HARQ-ACK codebook is applied to a similar scenario. Otherwise, the semi-static HARQ-ACK codebook may not include a candidate PDSCH reception occasion corresponding to HARQ-ACK information corresponding to the PDSCH repetition, and consequently, feedback cannot be performed normally. It may be specifically understood as that the semi-static HARQ-ACK codebook is not applicable to the case in which one same PDSCH is transmitted repeatedly in time domain in one slot for a plurality of times.

SUMMARY

An objective of the present disclosure is to provide an HARQ-ACK feedback position determining method and a communications device, to resolve a problem in the related technology that a semi-static HARQ-ACK codebook is not applicable to a case in which one same PDSCH is transmitted repeatedly in time domain in one slot for a plurality of times.

To solve the foregoing technical problem, the present disclosure is implemented as follows.

According to a first aspect, an embodiment of the present disclosure provides an HARQ-ACK feedback position determining method, including:
  when a repetition scheme of a PDSCH in one slot is configured or indicated, determining at least one candidate PDSCH reception occasion based on a start and length indicator (SLIV) of a time domain resource allocation (TDRA); and
  determining, based on a first PDSCH scheduled by using downlink control information (DCI) and the at least one candidate PDSCH reception occasion, a feedback position of an HARQ-ACK corresponding to the first PDSCH in a preset HARQ-ACK codebook, where the first PDSCH is transmitted for one or more times.

According to a second aspect, an embodiment of the present disclosure further provides a communications device, including:
  a first determining module, configured to: when a repetition scheme of a PDSCH in one slot is configured or indicated, determine at least one candidate PDSCH reception occasion based on an SLIV of a TDRA; and
  a second determining module, configured to determine, based on a first PDSCH scheduled by using DCI and the at least one candidate PDSCH reception occasion, a feedback position of an HARQ-ACK corresponding to the first PDSCH in a preset HARQ-ACK codebook, where the first PDSCH is transmitted for one or more times.

According to a third aspect, an embodiment of the present disclosure further provides a communications device, including: a processor, a memory, and a computer program that is stored in the memory and that can be run on the processor. When the computer program is executed by the processor, steps of the foregoing HARQ-ACK feedback position determining method are implemented.

According to a fourth aspect, an embodiment of the present disclosure further provides a computer readable storage medium. The computer readable storage medium stores a computer program. When the computer program is executed by a processor, steps of the foregoing HARQ-ACK feedback position determining method are implemented.

In the embodiments of the present disclosure, when the repetition scheme of the PDSCH in one slot is configured or indicated, the at least one candidate PDSCH reception occasion is determined based on the SLIV of the TDRA. The feedback position of the HARQ-ACK corresponding to the first PDSCH in the preset HARQ-ACK codebook is determined based on the first PDSCH scheduled by using the DCI and the at least one candidate PDSCH reception occasion. The first PDSCH is transmitted for one or more times. In this way, in the scenario in which the repetition scheme of the PDSCH in one slot is configured or indicated, a terminal determines the feedback position of the HARQ-ACK corresponding to the first PDSCH in the preset HARQ-ACK codebook by using the foregoing scheme, to feed back a semi-static HARQ-ACK codebook by using the feedback position. A network device determines the feedback position of the HARQ-ACK corresponding to the first PDSCH in the preset HARQ-ACK codebook, to receive the semi-static HARQ-ACK codebook by using the feedback position. In this way, the semi-static HARQ-ACK codebook is applicable to the scenario in which the same PDSCH is transmitted in time domain in one slot for a plurality of times.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings without creative efforts.

DETAILED DESCRIPTION

The example embodiments of the present disclosure are described in detail below with reference to the accompanying drawings. Although the accompanying drawings show example embodiments of the present disclosure, it should be understood that the present disclosure can be implemented in various forms and shall not be limited by embodiments described herein. On the contrary, these embodiments are provided for a thorough understanding of the present disclosure, and to convey the complete scope of the present disclosure to a person skilled in the art.

Terms such as "first" and "second" in the specification and claims of this application are used to distinguish between similar objects, and are unnecessarily used to describe a specific order or sequence. It should be understood that the data termed in such a way is interchangeable in proper circumstances so that the embodiments of this application described herein can be implemented in an order other than the order illustrated or described herein. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. "And/or" used in the specification and claims means at least one of the connected objects.

The following description provides examples and does not limit the scope, applicability, or configuration set forth in the claims. Functions and arrangements of elements to be discussed may be changed without departing from the spirit and scope of the present disclosure. Various examples may be appropriately omitted or replaced, or various routines or components may be added. For example, the described method may be performed according to a sequence different from the described sequence, and various steps may be added, omitted, or combined. In addition, features described with reference to some examples may be combined in other examples.

Figure 1:
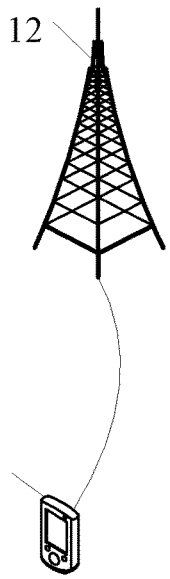
FIG. 1 is a structural diagram of a network system to which the embodiments of the present disclosure can be applied.

FIG. 1 is a block diagram of a wireless communications system to which the embodiments of the present disclosure may be applied. The wireless communications system includes a terminal 11 and a network device 12. The terminal 11 may be alternatively referred to as a terminal device or user equipment (UE). The terminal 11 may be a terminal side device such as a mobile phone, a tablet personal computer, a laptop computer, a personal digital assistant (PDA), a mobile internet device (MID), a wearable device, or an in-vehicle device. It should be noted that a specific type of the terminal 11 is not limited in this embodiment of the present disclosure. The network device 12 may be a base station or a core network. The base station may be a base station (for example, a gNB, a 5GNR, or a NB) in 5G or of a later release, or a base station (for example, an eNB, a WLAN access point, or another access point) in another communications system. The base station may be referred to as a node B, an evolved node B, an access point, a base transceiver station (BTS), a radio base station, a radio transceiver, a basic service set (BSS), an Extended Service Set (ESS), a node B, an evolved node B (eNB), a home node B, a home evolved node B, a WLAN access point, a WiFi node, or another appropriate term in the art. Provided that a same technical effect is achieved, the base station is not limited to a particular technical term. It should be noted that only a base station in an NR system is used as an example in the embodiments of the present disclosure, but a specific type of the base station is not limited.

Figure 2:
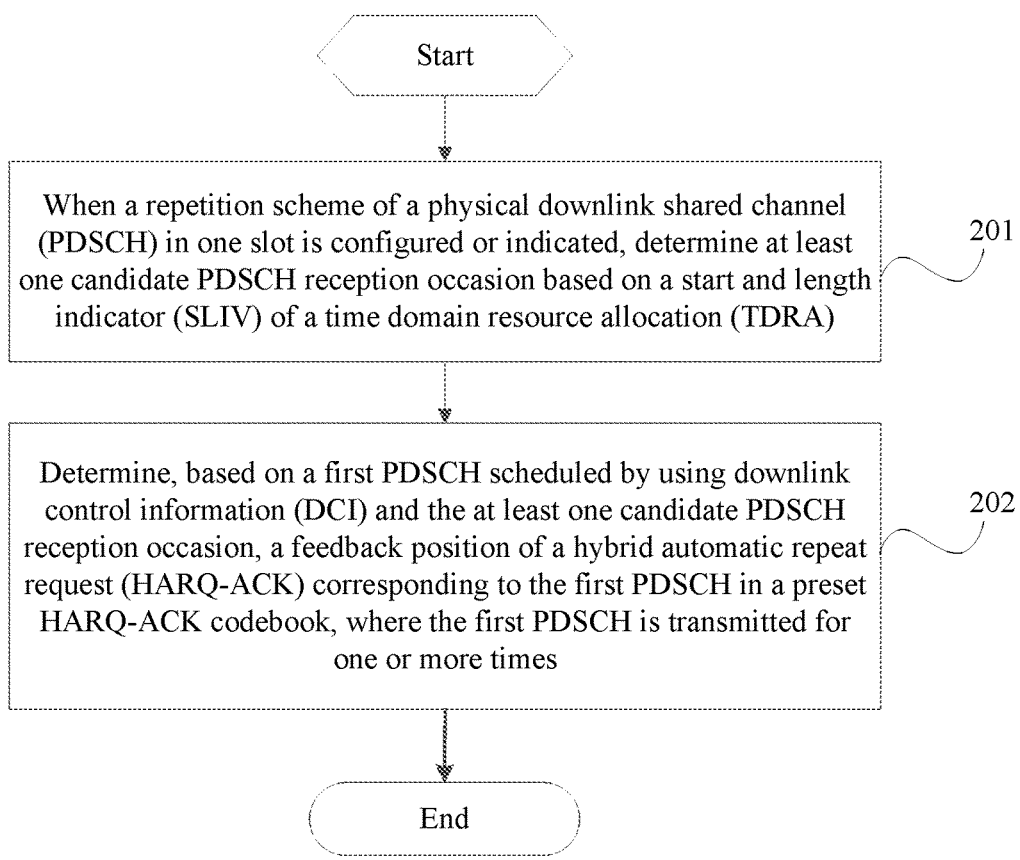
FIG. 2 is a schematic flowchart of an HARQ-ACK feedback position determining method according to an embodiment of the present disclosure.

As shown in FIG. 2, an embodiment of the present disclosure provides an HARQ-ACK feedback position determining method, including:

Step 201. When a repetition scheme of a PDSCH in one slot is configured or indicated, determine at least one candidate PDSCH reception occasion based on an SLIV of a TDRA.

Step 202. Determine, based on a first PDSCH scheduled by using DCI and the at least one candidate PDSCH reception occasion, a feedback position of an HARQ-ACK corresponding to the first PDSCH in a preset HARQ-ACK codebook, where the first PDSCH is transmitted for one or more times.

In this embodiment of the present disclosure, the preset HARQ-ACK codebook is a semi-static HARQ-ACK codebook, namely, an HARQ-ACK codebook of type 1.

This embodiment of the present disclosure provides the following two cases for a quantity of candidate PDSCH reception occasions corresponding to one TDRA.

In a first case, one TDRA corresponds to N candidate PDSCH reception occasions. Correspondingly, the determining at least one candidate PDSCH reception occasion based on an SLIV of a TDRA includes: determining N SLIVs based on M SLIVs; and determining N candidate PDSCH reception occasions based on the N SLIVs, where M represents the largest quantity of times of repeating the PDSCH in a time domain repetition scheme of a PDSCH in one slot, and the M SLIVs are determined based on an SLIV of one TDRA, a quantity of interval symbols between PDSCH repetitions, and a value of M; the N SLIVs are some or all of the M SLIVs; and M is an integer greater than 1, and N is an integer greater than or equal to 1 and less than or equal to M.

Specifically, the N SLIVs are located in a slot in which the first SLIV in the M SLIVs is located, and N is the largest quantity of SLIVs in the slot in which the first SLIV in the M SLIVs is located.

When the HARQ-ACK is fed back by using a granularity of a slot, the determining, based on a first PDSCH scheduled by using DCI and the at least one candidate PDSCH reception occasion, a feedback position of an HARQ-ACK corresponding to the first PDSCH in a preset HARQ-ACK codebook includes: when it is indicated by using the DCI that a quantity of repetition times in time domain is 1, determining that the feedback position is a position, in a first preset HARQ-ACK codebook, of the first candidate PDSCH reception occasion that corresponds to the first SLIV and that is determined by using a target TDRA; or when it is indicated by using the DCI that a quantity of repetition times in time domain is K, determining that the feedback position is a position, in a first preset HARQ-ACK codebook, of at least a $k^{th}$ candidate PDSCH reception occasion determined by using a target TDRA, where the target TDRA is a TDRA corresponding to the first PDSCH, K is an integer greater than 1 and less than or equal to N, and k is an integer greater than or equal to 1 and less than or equal to K.

When the HARQ-ACK is fed back by using a granularity of a sub-slot, the determining, based on a first PDSCH scheduled by using DCI and the at least one candidate PDSCH reception occasion, a feedback position of an HARQ-ACK corresponding to the first PDSCH in a preset HARQ-ACK codebook includes: when it is indicated by using the DCI that a quantity of repetition times in time domain is 1, determining that the feedback position is a position, in a second preset HARQ-ACK codebook, of a candidate PDSCH reception occasion that corresponds to the first SLIV and that is determined by using a target TDRA; or when it is indicated by using the DCI that a quantity of repetition times in time domain is K, determining that the feedback position is a position, in a second preset HARQ-ACK codebook, of a candidate PDSCH reception occasion that corresponds to a $K^{th}$ PDSCH repetition and that is determined by using a target TDRA, where the target TDRA is a TDRA corresponding to the first PDSCH, and K is an integer greater than 1 and less than or equal to N.

In this case, an SLIV occupied by an $n^{th}$ PDSCH repetition is determined by using an SLIV occupied by an $(n-1)^{th}$ PDSCH repetition and a PDSCH repetition interval, where n is an integer greater than 1 and less than or equal to N.

Further, the determining method further includes: determining that a position for feeding back a non-acknowledgement (NACK) is a position other than the feedback position in the preset HARQ-ACK codebook.

In this embodiment of the present disclosure, the determining N SLIVs based on M SLIVs includes: when a time domain repetition scheme of a PDSCH in one slot is configured or indicated, determining the N SLIVs based on the M SLIVs.

In this embodiment of the present disclosure, the determining N SLIVs based on M SLIVs includes: when a time domain repetition scheme of a PDSCH in one slot is configured or indicated, and the HARQ-ACK is fed back by using a granularity of a sub-slot, determining the N SLIVs based on the M SLIVs.

In a second case, one TDRA corresponds to one candidate PDSCH reception occasion.

The determining, based on a first PDSCH scheduled by using DCI and the at least one candidate PDSCH reception occasion, a feedback position of an HARQ-ACK corresponding to the first PDSCH in a preset HARQ-ACK codebook includes: when it is indicated by using the DCI that a quantity of repetition times in time domain is 1 or K, determining that the feedback position is a position, in the preset HARQ-ACK codebook, of a candidate PDSCH reception occasion determined by using a target TDRA, where the target TDRA is a TDRA corresponding to the first PDSCH, and K is an integer greater than 1 and less than or equal to N.

When it is indicated by using the DCI that the quantity of repetition times in time domain is 1, a case in which the PDSCH is repeated in frequency domain for one or more times is included.

In this embodiment of the present disclosure, when a frequency domain repetition scheme of a PDSCH in one slot is configured or indicated, one TDRA corresponds to one candidate PDSCH reception occasion.

In this embodiment of the present disclosure, when the HARQ-ACK is fed back by using a granularity of a slot, one TDRA corresponds to one candidate PDSCH reception occasion.

In the foregoing technical solution provided in this embodiment of the present disclosure, in a scenario in which the repetition scheme of the PDSCH in one slot is configured or indicated, a terminal determines the feedback position of the HARQ-ACK corresponding to the first PDSCH in the preset HARQ-ACK codebook by using the foregoing scheme, to feed back the semi-static HARQ-ACK codebook by using the feedback position. A network device determines the feedback position of the HARQ-ACK corresponding to the first PDSCH in the preset HARQ-ACK codebook, to receive the semi-static HARQ-ACK codebook by using the feedback position. In this way, the semi-static HARQ-ACK codebook is applicable to the scenario in which one same PDSCH is transmitted repeatedly in time domain in one slot for a plurality of times. The foregoing second case is also applicable to a scenario in which one same PDSCH is transmitted repeatedly in frequency domain in one slot.

The following further describes the HARQ-ACK feedback position determining method provided in this embodiment of the present disclosure.

First, a codebook type and a transmission scheme that may be used in this embodiment of the present disclosure are introduced.

1. An HARQ-ACK codebook of a single transmission point (TRP) mainly has the following two types:

Type 1: Semi-static HARQ-ACK codebook: UE (the terminal) determines, based on parameters configured by using radio resource control (RRC) such as a physical downlink control channel (PDCCH) monitoring occasion, a PDSCH-TDRA, and PDSCH-to-HARQ-ACK feedback timing (configured by using an RRC parameter dl-DataToUL-ACK or indicated by a PDSCH-to-HARQ feedback timing indicator field of DCI), an HARQ-ACK codebook for all PDSCHs for which feedback may be performed in a slot. Because HARQ of an actually scheduled PDSCH and HARQ of a PDSCH that is not scheduled may be included, a codebook thereof is generally large.

Type 2: Dynamic HARQ-ACK codebook: UE determines an HARQ-ACK codebook based on an actually scheduled PDSCH. Because feedback is performed only for the actually scheduled PDSCH, a size of an HARQ-ACK codebook thereof is generally smaller than the size of the semi-static HARQ-ACK codebook. A type of a codebook specifically used by the UE is determined by using RRC configuration. When the dynamic HARQ-ACK codebook is used, to prevent a case in which quantities of HARQ-ACK bits perceived by a receiving party and a sending party are different because the UE cannot correctly detect a scheduled PDCCH, a base station adds a downlink assignment index (DAI) to DCI. The DAI may be divided into two parts: a counter DAI and a total DAI that is in a carrier aggregation scenario. The counter DAI is used to indicate a quantity of downlink transmissions scheduled by using the DCI, and the total DAI indicates a total quantity of downlink transmissions performed on all carriers of the DCI.

2. A multi-TRP ultra-reliable and low latency communications (URLLC) transmission scheme mainly includes the following four schemes.

Scheme 1 (space division multiplexing (SDM)): q (q is less than or equal to a quantity Ns of space domains) transmission configuration indicator (TCI) states are indicated in one slot, and time-frequency resources of transmission occasions overlap with each other.

(1) Scheme 1a:

1). Each transmission occasion is one layer or a set of a plurality of layers of a same transport block (TB), and the foregoing one layer or the foregoing set of the plurality of layers is associated with one TCI state and one demodulation reference signal (DMRS) port or port set.

2). A single coded codeword of a redundancy version (RV) is mapped to all space layers or layer sets. From the perspective of the UE, different coded bits are mapped to different layers or layer sets by using a preset mapping rule.

Scheme 2 (frequency division multiplexing (FDM)): q (q is less than or equal to Ns) TCI states are indicated in one slot, and frequency domain resources of transmission occasions do not overlap with each other.

(1) Each non-overlapping frequency domain resource is associated with one TCI state.

(2) All non-overlapping frequency domain resources are associated with one or more same DMRS ports (this means that DMRSs of all transmission occasions are the same (namely, are repeated), and each transmission occasion may be one DMRS port or a plurality of DMRS ports).

(3) Scheme 2a:

1). Transmission on all resources is performed by using one single coded codeword of an RV. From the perspective of the UE, the single coded codeword is mapped to all resources by using a preset codeword-to-layer mapping rule.

(4) Scheme 2b:

1). Transmission on each non-overlapping frequency domain resource is performed by using one single coded codeword of an RV. Each non-overlapping frequency domain resource may correspond to a same or different RV.

Scheme 3 (time division multiplexing (TDM)): q (q is less than or equal to the largest quantity Ntl in one slot) TCI states are indicated in one slot, and time domain resources do not overlap with each other.

1). A TB transmitted by using each transmission occasion corresponds to one TCI state and one RV, and for the transmission occasion, transmission is performed by using a time domain granularity of a mini-slot.

2). For all transmission occasions in one slot, a same modulation and coding scheme (MCS) and one or more same DMRS ports are used.

3). A same RV or different RVs and/or a same TCI state or different TCI states may be used for the plurality of transmission occasions.

4). A quantity of repetition times is dynamically determined as 1 or 2 based on a quantity of TCI states indicated in the DCI, and a quantity of interval symbols between two PDSCH repetitions is configured by using RRC. The quantity of interval symbols is 0 if the quantity is not configured.

Scheme 4 (TDM): q (q is less than or equal to X) TCI states are indicated in X slots.

1). A TB transmitted by using each transmission occasion corresponds to one TCI state and one RV 2). For all transmission occasions in the X slots, a same MCS and one or more same DMRS ports are used.

3). A same RV or different RVs and/or a same TCI state or different TCI states may be used for the plurality of transmission occasions.

4). A quantity of repetition times is dynamically determined based on a repetition parameter of one item in a TDRA table scheduled by using the DCI.

The HARQ-ACK codebook of type 1 cannot be directly applied to the foregoing scheme 3, and needs to be clarified for the foregoing scheme 2b. It may be specifically understood that the HARQ-ACK codebook of type 1 is not applicable to a case in which one same PDSCH is transmitted repeatedly in time domain in one slot for a plurality of times.

For the foregoing technical problem, an embodiment of the present disclosure provides an HARQ-ACK feedback position determining method. Specifically, a method for determining a candidate PDSCH reception occasion of an HARQ-ACK codebook of type 1 for various schemes (especially for scheme 3) of multi-TRP URLLC is provided. The following several parameters may be used in this scheme:

K0 represents a value of a downlink slot offset value, indicated by using a time domain resource assignment field in downlink DCI, between a PDSCH and a PDCCH. The value of the downlink slot offset is based on a numerology of the PDSCH.

K1 represents a value of an uplink slot offset or an uplink sub-slot offset, obtained based on a PDSCH-to-HARQ feedback timing indicator or a higher layer parameter (dl-DataToUL-ACK) of the downlink DCI, between an uplink slot in which a PUCCH, for which an HARQ-ACK is fed back, is located and an uplink slot corresponding to a downlink slot in which a PDSCH is located.

K2 represents a value of an uplink slot offset, indicated by using a time domain resource assignment field in uplink DCI, between a physical uplink shared channel (PUSCH) and a PDCCH. The value of the uplink slot offset is based on a numerology of the PUSCH.

The schemes provided in this embodiment of the present disclosure may specifically include the following content during implementation:

1. When it is determined that the repetition scheme is the foregoing scheme 3 or 2b, either of the following two manners may be used:

Manner 1:

(1) One TDRA in the codebook of type 1 corresponds to N candidate PDSCH reception occasions, and positions of the N candidate PDSCH reception occasions in the codebook of type 1 are determined based on a start symbol of each TDRA.

1). Only a TDRA that includes a PDSCH repetition interval and for which symbols occupied by N PDSCH repetitions are in the slot is determined as the N candidate PDSCH reception occasions, where N is an integer greater than or equal to 1 and less than or equal to M. The other TDRA is still determined as one candidate PDSCH reception occasion. A quantity of PDSCH repetition intervals may be 0 or may be any integer greater than 0.

When scheme 3 is configured or indicated for the UE, a largest quantity of repetition times of the PDSCH in time domain in one slot is M=2. When scheme 2b is configured or indicated for the UE, a quantity of frequency domain repetition times of the PDSCH in one slot is 2.

2). An SLIV occupied by an $n^{th}$ PDSCH repetition is determined based on an SLIV occupied by an $(n-1)^{th}$ PDSCH repetition and a PDSCH repetition interval.

(2) When an HARQ-ACK is fed back, if a quantity of repetition times (determined based on, for example, a quantity of TCI states) indicated in the DCI used to schedule the PDSCH is 1, HARQ-ACK information corresponding to the PDSCH is fed back only in a position corresponding to the first candidate PDSCH reception occasion corresponding to the TDRA (the TDRA corresponding to the scheduled PDSCH) in the codebook of type 1.

1). For a position corresponding to the other candidate PDSCH reception occasion corresponding to the TDRA, an NACK is fed back if no PDSCH is scheduled.

(3) When an HARQ-ACK is fed back, if a quantity of repetition times (determined based on, for example, a quantity of TCI states) indicated in the DCI used to schedule the PDSCH is K (an integer greater than 1 and less than or equal to N), HARQ-ACK information corresponding to the PDSCH is fed back at least in a position corresponding to a $k^{th}$ (k is any integer from 1 to K, for example, 1 or K) candidate PDSCH reception occasion corresponding to the TDRA in the codebook of type 1.

1). An NACK is fed back in a position corresponding to the other candidate PDSCH reception occasion corresponding to the TDRA.

(4) A start slot of K1 is an uplink slot corresponding to a downlink slot in which the last PDSCH repetition (PDSCH transmission occasion) is located.

The following describes an implementation of manner 1 (namely, the foregoing manner 1) by way of example.

Figure 3:
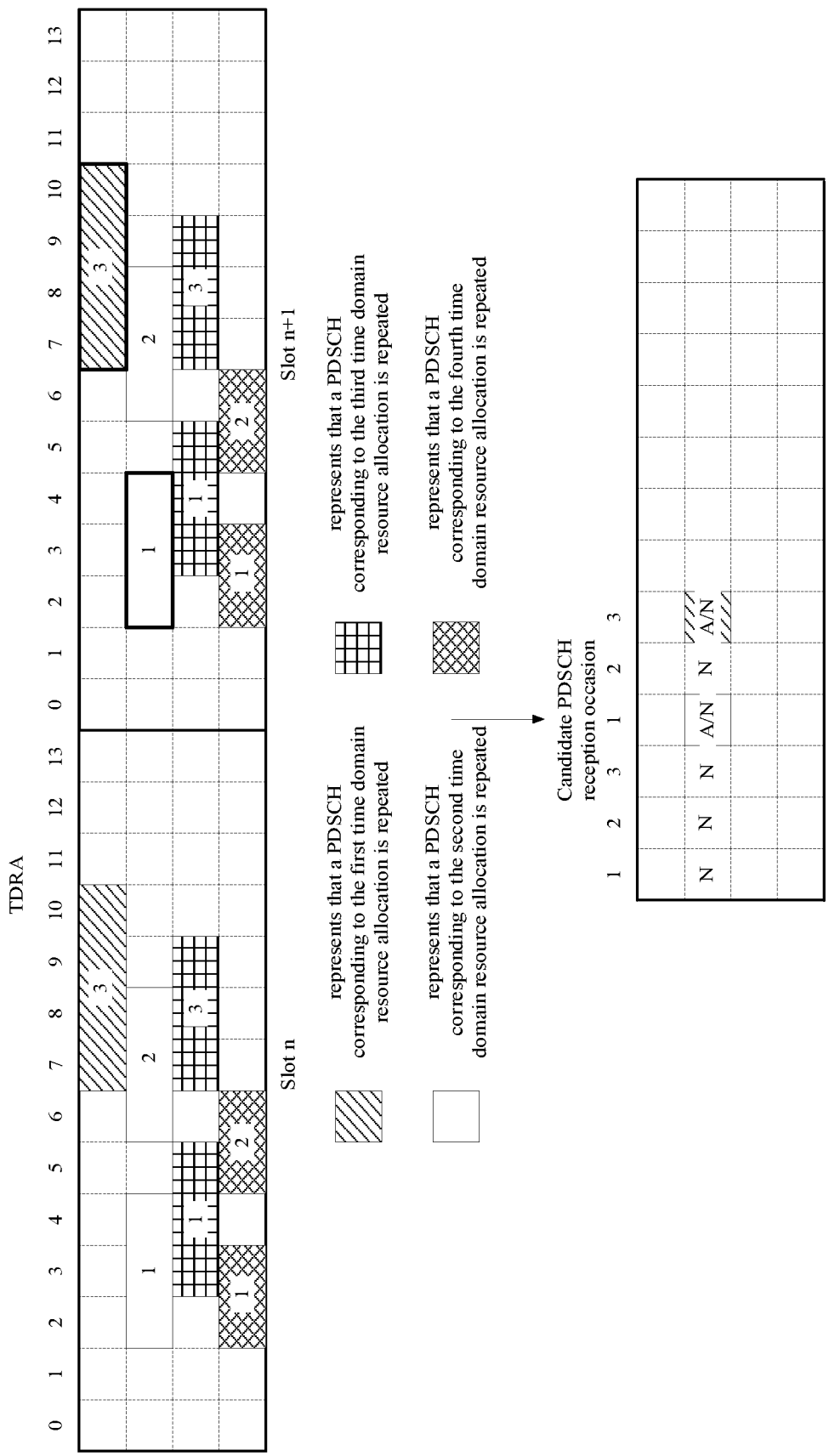
FIG. 3 is a first schematic example diagram of manner 1 according to an embodiment of the present disclosure.

In example 1, as shown in FIG. 3, one row of the table represents one TDRA. Four TDRAs are included in the figure. Candidate PDSCH reception occasions determined based on SLIVs of the TDRAs are 1, 2, and 3. A solid box represents a selected SLIV (the actually scheduled PDSCH, namely, the first PDSCH), and feedback positions of corresponding HARQ-ACKs in a preset HARQ-ACK codebook are, as shown in the figure, positions of the second 1 and the second 3 (namely, some feedback positions corresponding to a slot n+1, where feedback positions corresponding to a slot n include positions corresponding to the first 1, the first 2, and the first 3 in the candidate PDSCH reception occasions in the table, and feedback positions corresponding the slot n+1 include positions of the second 1, the second 2, and the second 3 in the candidate PDSCH reception occasions in the table).

Figure 4:
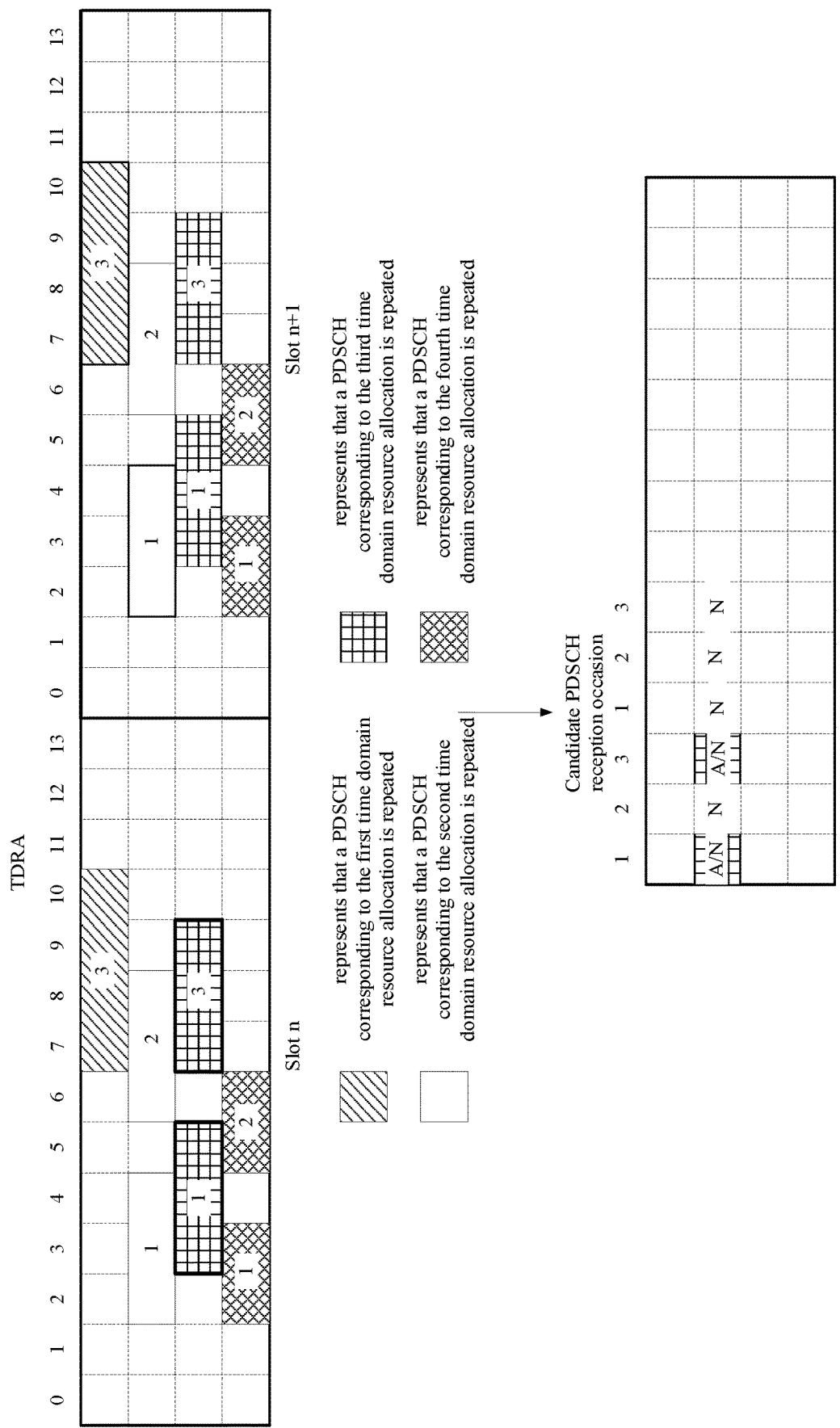
FIG. 4 is a second schematic example diagram of manner 1 according to an embodiment of the present disclosure.

In example 2, as shown in FIG. 4, one row of the table represents one TDRA. Four TDRAs are included in the figure. Candidate PDSCH reception occasions determined based on SLIVs of the TDRAs are 1, 2, and 3. A solid box represents a selected SLIV (the actually scheduled PDSCH, namely, the first PDSCH), and feedback positions of a corresponding HARQ-ACK in a preset HARQ-ACK codebook are, as shown in the figure, positions of the first 1 and the first 3 (namely, some feedback positions corresponding to a slot n, where feedback positions corresponding to the slot n include positions corresponding to the first 1, the first 2, and the first 3 in the candidate PDSCH reception occasion in the table, and feedback positions corresponding a slot n+1 include positions of the second 1, the second 2, and the second 3 in the candidate PDSCH reception occasion in the table).

Manner 2: (This manner is also applicable to the foregoing scheme 1a, scheme 2a, or scheme 4)

(1) One TDRA in the codebook of type 1 corresponds to one candidate PDSCH reception occasion, and a position in the codebook of type 1 is determined based on a start symbol of the TDRA.

(2) When an HARQ-ACK is fed back, if a quantity of repetition times (determined based on, for example, a quantity of TCI states) indicated in the DCI used to schedule the PDSCH is 1 or K (an integer greater than 1 and less than or equal to N), HARQ-ACK information corresponding to the PDSCH is fed back in a position corresponding to a candidate PDSCH reception occasion corresponding to the TDRA in the codebook of type 1.

The following describes an implementation of manner 2 (namely, the foregoing manner 2) by way of example.

Figure 5:
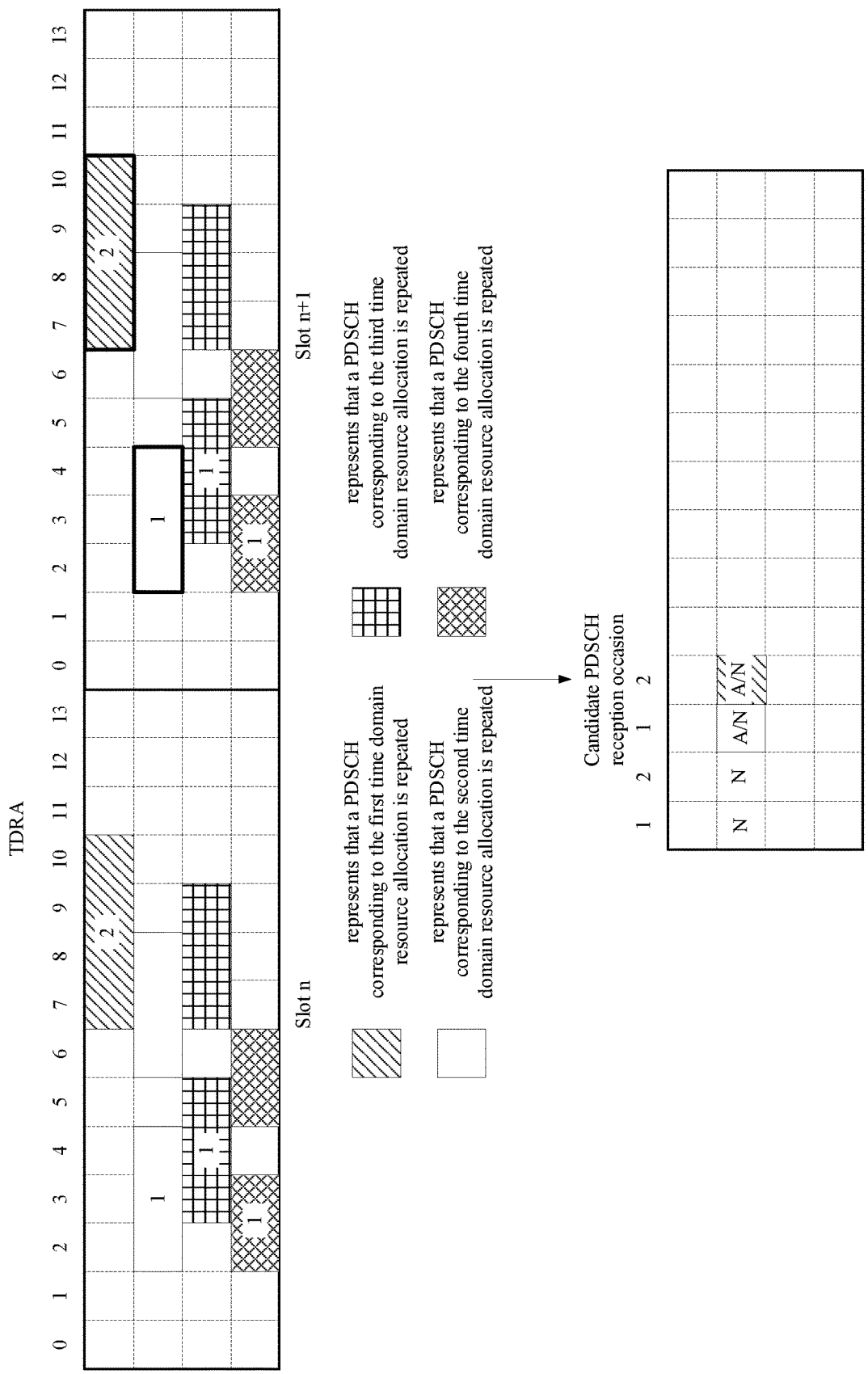
FIG. 5 is a first schematic example diagram of manner 2 according to an embodiment of the present disclosure.

In example 1, as shown in FIG. 5, one row of the table represents one TDRA. Four TDRAs are included in the figure. Candidate PDSCH reception occasions determined based on SLIVs of the TDRAs are 1 and 2. A solid box represents a selected SLIV (the actually scheduled PDSCH, namely, the first PDSCH), and a feedback positions of corresponding HARQ-ACKs in a preset HARQ-ACK codebook are, as shown in the figure, positions of the second 1 and the second 2 (namely, feedback positions corresponding to a slot n+1, where feedback positions corresponding to a slot n include positions corresponding to the first 1 and the first 2 in the candidate PDSCH reception occasion in the table, and feedback positions corresponding the slot n+1 include positions of the second 1 and the second 2 in the candidate PDSCH reception occasion in the table).

Figure 6:
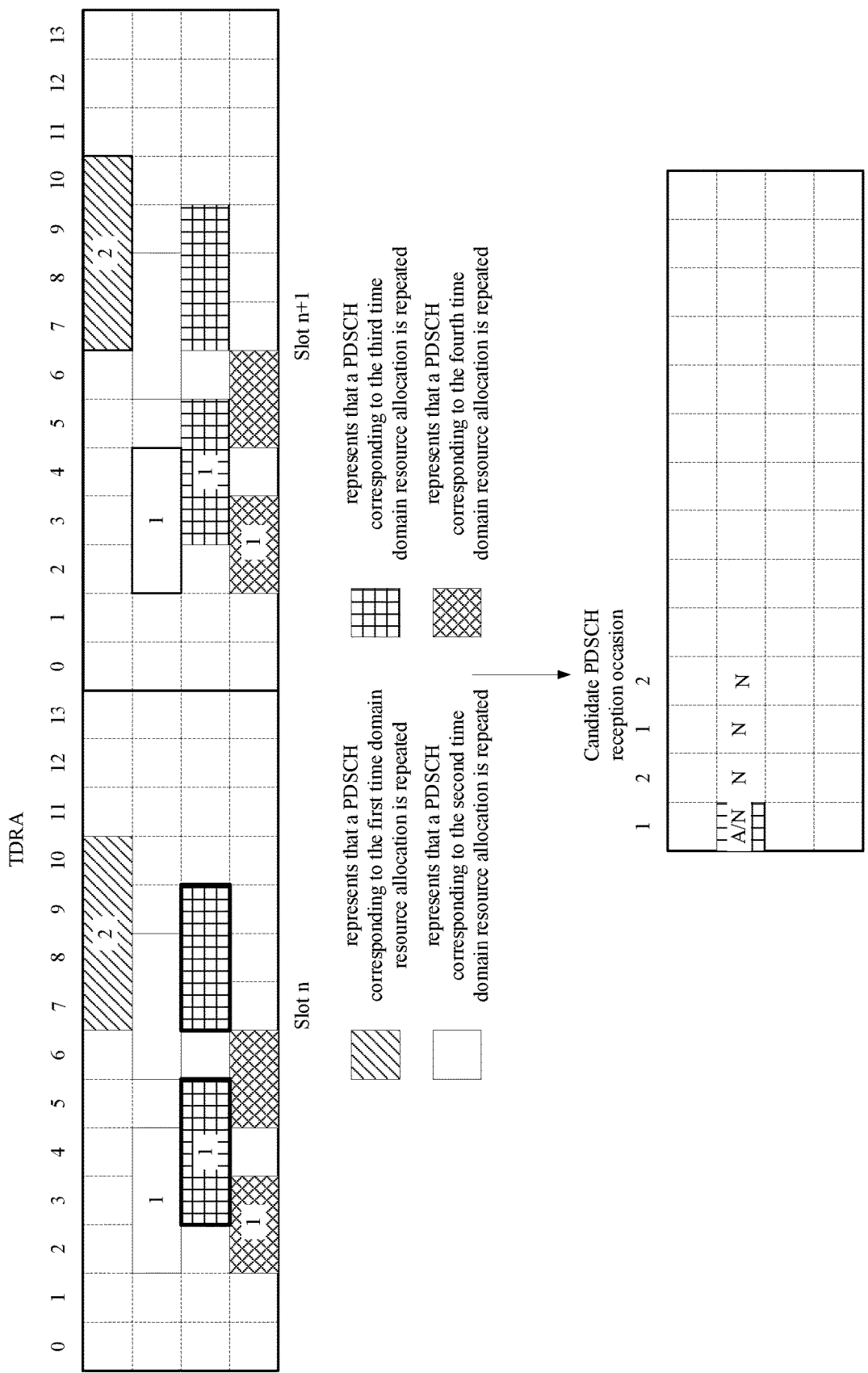
FIG. 6 is a second schematic example diagram of manner 2 according to an embodiment of the present disclosure.

In example 2, as shown in FIG. 6, one row of the table represents one TDRA. Four TDRAs are included in the figure. Candidate PDSCH reception occasions determined based on SLIVs of the TDRAs are 1 and 2. A solid box represents a selected SLIV (the actually scheduled PDSCH, namely, the first PDSCH), and a feedback position of a corresponding HARQ-ACK in a preset HARQ-ACK codebook is, as shown in the figure, a position of the first 1 (namely, a feedback position corresponding to a slot n, where feedback positions corresponding to the slot n include positions corresponding to the first 1 and the first 2 in the candidate PDSCH reception occasion in the table, and feedback positions corresponding a slot n+1 include positions of the second 1 and the second 2 in the candidate PDSCH reception occasion in the table).

2. When it is determined that the repetition scheme is the foregoing scheme 1a, scheme 2a, or scheme 2b, one TDRA corresponds to only one candidate PDSCH reception occasion.

3. When a symbol occupied by a PDSCH of a second PDSCH repetition does not overlap with another SLIV in the TDRA table, a candidate PDSCH reception occasion is determined based on the foregoing manner 1 (or manner 2). When a symbol occupied by a PDSCH of a second PDSCH repetition overlaps with at least one SLIV in the TDRA table, a candidate PDSCH reception occasion is determined based on the foregoing manner 2 (or manner 1).

4. When it is configured that an HARQ-ACK is fed back by using a granularity of a sub-slot or it is configured that a PUCCH uses a granularity of a sub-slot, if SLIVs of N PDSCH repetitions corresponding to one TDRA correspond to different uplink sub-slots (determined based on an uplink sub-slot corresponding to the last symbol of the SLIV of the PDSCH as stipulated in the related technology), K1 starts from an uplink sub-slot corresponding to the last symbol of an $N^{th}$ PDSCH repetition:

(1) A PDSCH reception occasion is determined based on Manner 1:

1). If a quantity of repetition times (determined based on, for example, a quantity of TCI states) indicated in DCI used to schedule a PDSCH is 1, HARQ-ACK information of the PDSCH is fed back in a position corresponding to the first candidate PDSCH reception occasions corresponding to the TDRA in the codebook of type 1.

2). If a quantity of repetition times (determined based on, for example, a quantity of TCI states) indicated in the DCI used to schedule the PDSCH is K (an integer greater than 1 and less than or equal to N), HARQ-ACK information corresponding to the PDSCH is fed back at least in a position corresponding to a K$^{th}$ candidate PDSCH reception occasion corresponding to the TDRA in the codebook of type 1.

The following describes an implementation of manner 1 in this scenario by way of example.

Figure 7:
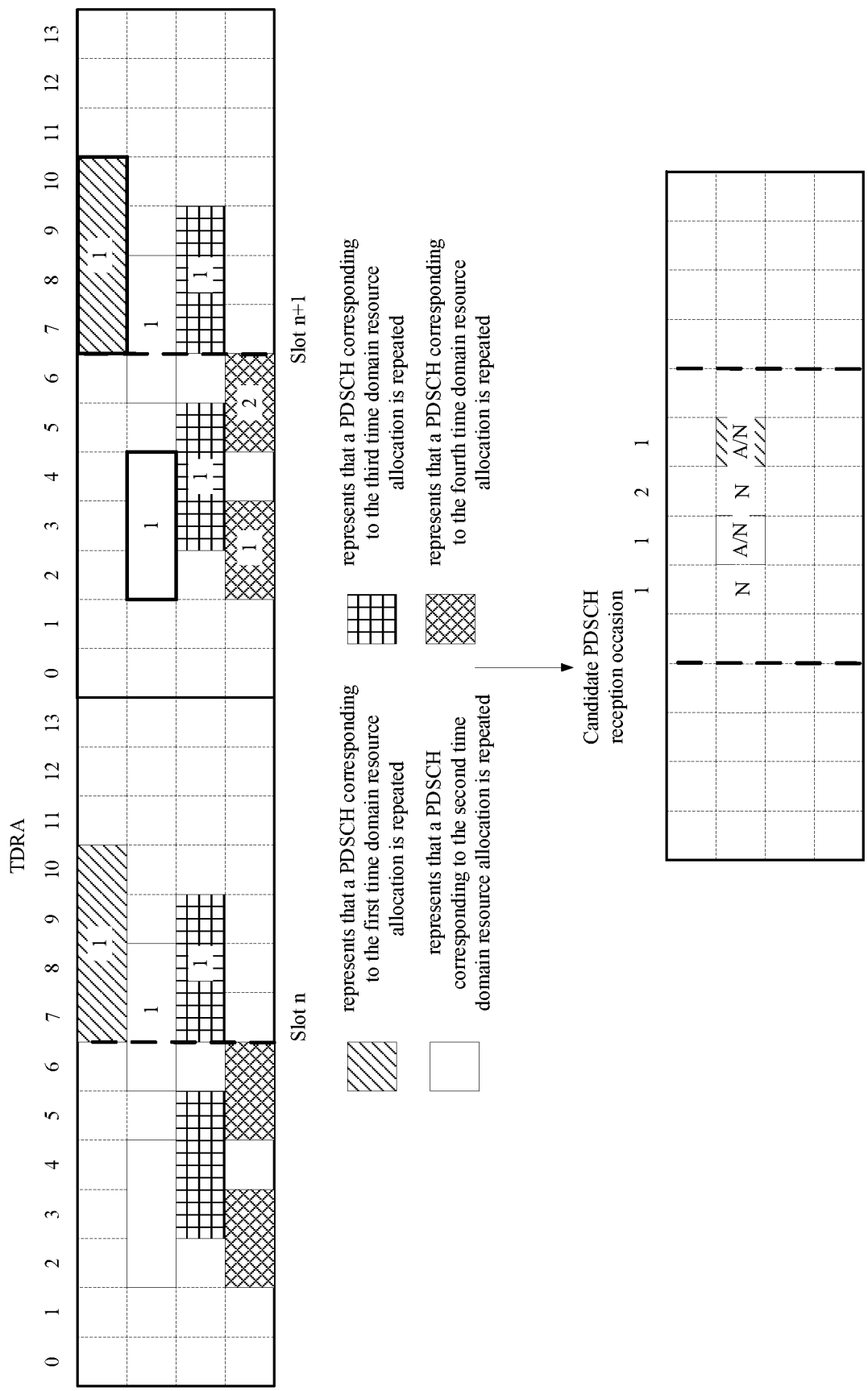
FIG. 7 is a third schematic example diagram of manner 1 according to an embodiment of the present disclosure.
Figure 8:
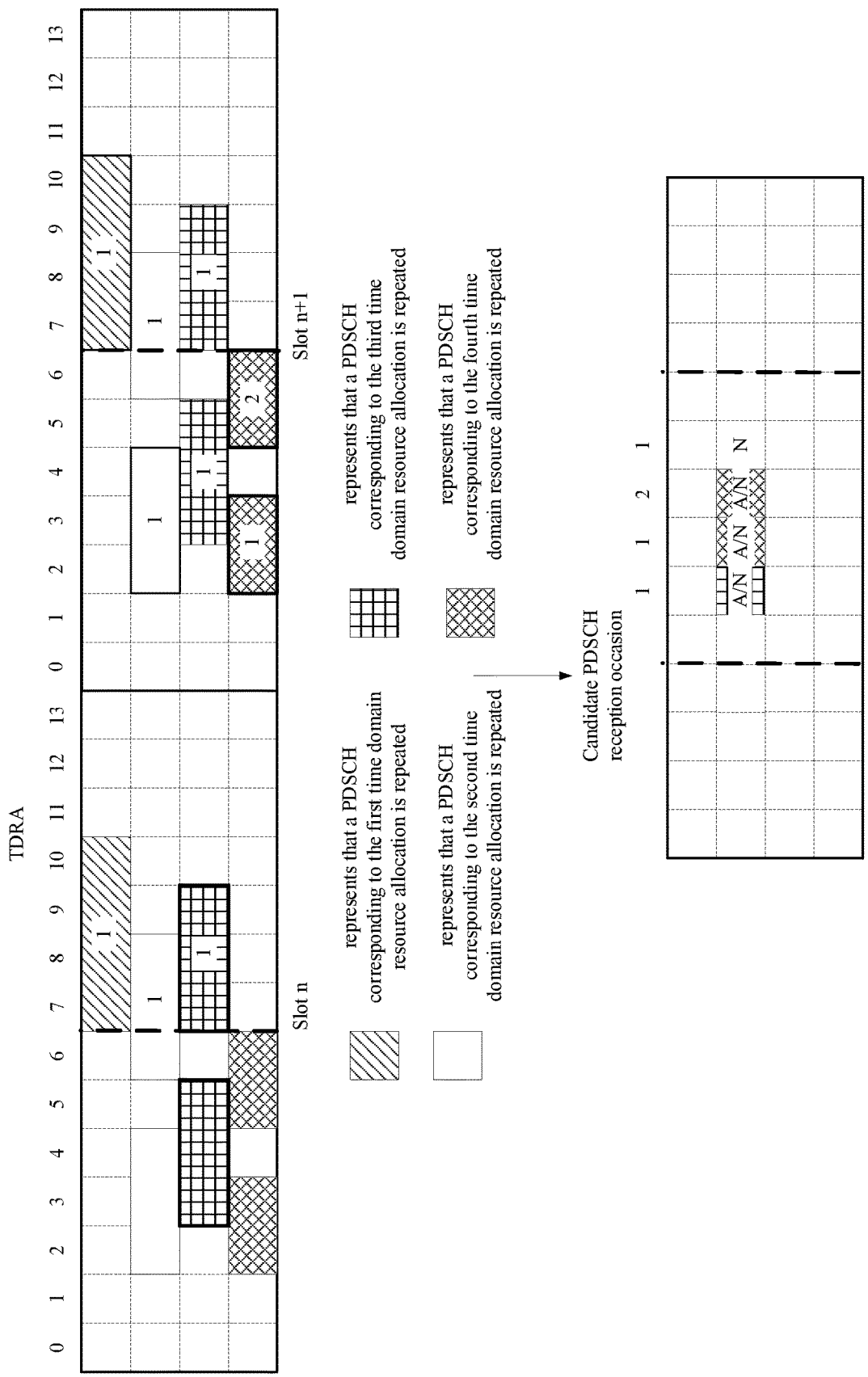
FIG. 8 is a fourth schematic example diagram of manner 1 according to an embodiment of the present disclosure.

As shown in FIG. 7 and FIG. 8, one slot is divided into two sub-slots by a dashed line. It is determined based on a K1 set that a window used to feed back an HARQ-ACK in a sub-slot used to feed back the HARQ-ACK is the latter half sub-slot corresponding to a slot n and two sub-slots corresponding to a slot n+1. Candidate PDSCH reception occasions determined in the three corresponding sub-slots based on the TDRA table and the foregoing manner 1 are 1, 1, 2, and 1.

In example 1, as shown in FIG. 7, one row of the table represents one TDRA. Four TDRAs are included in the figure. Candidate PDSCH reception occasions determined based on SLIVs of the TDRAs are 1, 1, 2, and 1. A solid box represents a selected SLIV (the actually scheduled PDSCH, namely, the first PDSCH), and feedback positions of corresponding HARQ-ACKs in a preset HARQ-ACK codebook are, as shown in the figure, positions of the second 1 and the third 1 (namely, some feedback positions corresponding to a slot n+1, where a feedback position corresponding to a slot n includes a position corresponding to the first 1 in the candidate PDSCH reception occasion in the table, and feedback positions corresponding the slot n+1 include positions of the second 1, the first 2, and the third 1 in the candidate PDSCH reception occasion in the table).

In example 2, as shown in FIG. 8, one row of the table represents one TDRA. Four TDRAs are included in the figure. Candidate PDSCH reception occasions determined based on SLIVs of the TDRAs are 1, 1, 2, and 1. A solid box represents a selected SLIV (the actually scheduled PDSCH, namely, the first PDSCH), and feedback positions of corresponding HARQ-ACKs in a preset HARQ-ACK codebook are, as shown in the figure, positions of the first 1, the second 1, and the first 2 (namely, a feedback position corresponding to a slot n and some feedback positions corresponding to a slot n+1, where the feedback position corresponding to the slot n includes a position corresponding to the first 1 in the candidate PDSCH reception occasion in the table, and a feedback position corresponding the slot n+1 includes positions of the second 1, the first 2, and the third 1 in the candidate PDSCH reception occasion in the table).

5. When it is configured that an HARQ-ACK is fed back by using a granularity of a sub-slot or it is configured that a PUCCH uses a granularity of a sub-slot, a PDSCH reception occasion is determined by using the foregoing manner 1, or otherwise, a PDSCH reception occasion is determined by using the foregoing manner 2.

It can be learned that the method for determining a candidate PDSCH reception occasion of an HARQ-ACK codebook of type 1 in various schemes of multi-TRP URLLC is provided in the solution provided in this embodiment of the present disclosure. It is noted herein that if the various schemes of URLLC are configured semi-statically, the foregoing manner 1 and manner 2 are applicable, but a relatively small quantity of bits are fed back in manner 2; or if the various schemes are dynamically switched, the foregoing manner 2 is applicable.

Further, in this embodiment of the present disclosure, when scheme 2a or scheme 2b is configured or indicated for the UE, if it is determined that a phase tracking reference signal (PTRS) is to be transmitted, a quantity of PTRS ports of a frequency domain resource corresponding to each TCI state is 1, a frequency density of the PTRS is a density of a frequency domain resource corresponding to each TCI state.

Figure 9:
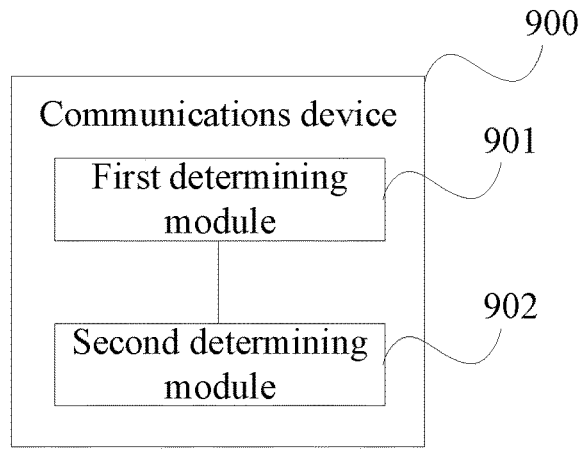
FIG. 9 is a schematic structural diagram of a communications device according to an embodiment of the present disclosure.

FIG. 9 is a schematic diagram of modules of a communications device according to an embodiment of the present disclosure. As shown in FIG. 9, the communications device 900 provided in this embodiment of the present disclosure includes:

a first determining module 901, configured to: when a repetition scheme of a PDSCH in one slot is configured or indicated, determine at least one candidate PDSCH reception occasion based on an SLIV of a TDRA; and a second determining module 902, configured to determine, based on a first PDSCH scheduled by using DCI and the at least one candidate PDSCH reception occasion, a feedback position of an HARQ-ACK corresponding to the first PDSCH in a preset HARQ-ACK codebook, where the first PDSCH is transmitted for one or more times.

This embodiment of the present disclosure provides the following two cases for a quantity of candidate PDSCH reception occasions corresponding to one TDRA.

In a first case, one TDRA corresponds to N candidate PDSCH reception occasions. The first determining module includes a first determining submodule, configured to determine N SLIVs based on M SLIVs; and a second determining submodule, configured to determine the N candidate PDSCH reception occasions based on the N SLIVs, where M represents the largest quantity of times of repeating the PDSCH in a time domain repetition scheme of a PDSCH in one slot, and the M SLIVs are determined based on the SLIV of the one TDRA, a quantity of interval symbols between PDSCH repetitions, and a value of M; the N SLIVs are some or all of the M SLIVs; and M is an integer greater than 1, and N is an integer greater than or equal to 1 and less than or equal to M.

Specifically, the N SLIVs are located in a slot in which the first SLIV in the M SLIVs is located, and N is the largest quantity of SLIVs in the slot in which the first SLIV in the M SLIVs is located.

When the HARQ-ACK is fed back by using a granularity of a slot, the second determining module includes a third determining submodule, configured to: when it is indicated by using the DCI that a quantity of repetition times in time domain is 1, determine that the feedback position is a position, in a first preset HARQ-ACK codebook, of a first candidate PDSCH reception occasion that corresponds to the first SLIV and that is determined by using a target TDRA; or when it is indicated by using the DCI that a quantity of repetition times in time domain is K, determine that the feedback position is a position, in a first preset HARQ-ACK codebook, of at least a k$^{th}$ candidate PDSCH reception occasion determined by using a target TDRA, where the target TDRA is a TDRA corresponding to the first PDSCH, and K is an integer greater than 1 and less than or equal to N, and k is an integer greater than or equal to 1 and less than or equal to K.

When the HARQ-ACK is fed back by using a granularity of a sub-slot, the second determining module includes: a fourth determining submodule, configured to: when it is indicated by using the DCI that a quantity of repetition times in time domain is 1, determine that the feedback position is a position, in a second preset HARQ-ACK codebook, of a candidate PDSCH reception occasion that corresponds to the first SLIV and that is determined by using a target TDRA; or when it is indicated by using the DCI that a quantity of repetition times in time domain is K, determine that the feedback position is a position, in a second preset HARQ- ACK codebook, of a candidate PDSCH reception occasion that corresponds to a $K^{th}$ PDSCH repetition and that is determined by using a target TDRA, where the target TDRA is a TDRA corresponding to the first PDSCH, and K is an integer greater than 1 and less than or equal to N.

In this case, an SLIV occupied by an $n^{th}$ PDSCH repetition is determined by using an SLIV occupied by an $(n-1)^{th}$ PDSCH repetition and a PDSCH repetition interval, where n is an integer greater than 1 and less than or equal to N.

Further, the communications device further includes: a third determining module, configured to determine that a position for feeding back an NACK is a position other than the feedback position in the preset HARQ-ACK codebook.

In this embodiment of the present disclosure, the first determining submodule includes a first determining unit, configured to: when a time domain repetition scheme of a PDSCH in one slot is configured or indicated, determine the N SLIVs based on the M SLIVs.

In this embodiment of the present disclosure, the first determining submodule includes a second determining unit, configured to: when a time domain repetition scheme of a PDSCH in one slot is configured or indicated, and the HARQ-ACK is fed back by using a granularity of a sub-slot, determine the N SLIVs based on the M SLIVs.

In a second case, one TDRA corresponds to one candidate PDSCH reception occasion.

The second determining module includes a fifth determining submodule, configured to: when it is indicated by using the DCI that a quantity of repetition times in time domain is 1 or K, determine that the feedback position is a position, in a preset HARQ-ACK codebook, of a candidate PDSCH reception occasion determined by using a target TDRA, where the target TDRA is a TDRA corresponding to the first PDSCH, and K is an integer greater than 1 and less than or equal to N.

In this embodiment of the present disclosure, when a frequency domain repetition scheme of a PDSCH in one slot is configured or indicated, one TDRA corresponds to one candidate PDSCH reception occasion.

In this embodiment of the present disclosure, when the HARQ-ACK is fed back by using a granularity of a slot, one TDRA corresponds to one candidate PDSCH reception occasion.

In the technical solution provided in this embodiment of the present disclosure, in a scenario in which the repetition scheme of the PDSCH in one slot is configured or indicated, the terminal determines the feedback position of the HARQ-ACK corresponding to the first PDSCH in the preset HARQ-ACK codebook by using the foregoing scheme, to feed back the semi-static HARQ-ACK codebook in the feedback position. A network device determines the feedback position of the HARQ-ACK corresponding to the first PDSCH in the preset HARQ-ACK codebook, to receive the semi-static HARQ-ACK codebook by using the feedback position. In this way, the semi-static HARQ-ACK codebook is applicable to the scenario in which one same PDSCH is transmitted in time domain in one slot for a plurality of times. The foregoing second case is also applicable to a scenario in which one same PDSCH is transmitted repeatedly in frequency domain in one slot.

The communications device provided in this embodiment of the present disclosure can implement the processes implemented by the communications device in the HARQ-ACK feedback position determining method embodiment. To avoid repetition, details are not described herein again.

An embodiment of the present disclosure further provides a communications device, including: a memory, a processor, and a computer program that is stored in the memory and that can be run on the processor. When the computer program is executed by the processor, processes of the foregoing HARQ-ACK feedback position determining method embodiment are implemented, and a same technical effect can be achieved. To avoid repetition, details are not described herein again.

An embodiment of the present disclosure further provides a computer-readable storage medium. The computer-readable storage medium stores a computer program. When the computer program is executed by a processor, processes of the HARQ-ACK feedback position determining method embodiment are implemented, and a same technical effect can be achieved. To avoid repetition, details are not described herein again. The computer readable storage medium is, for example, a read-only memory (ROM), a random access memory (RAM), a magnetic disk, or an optical disc.

Figure 10:
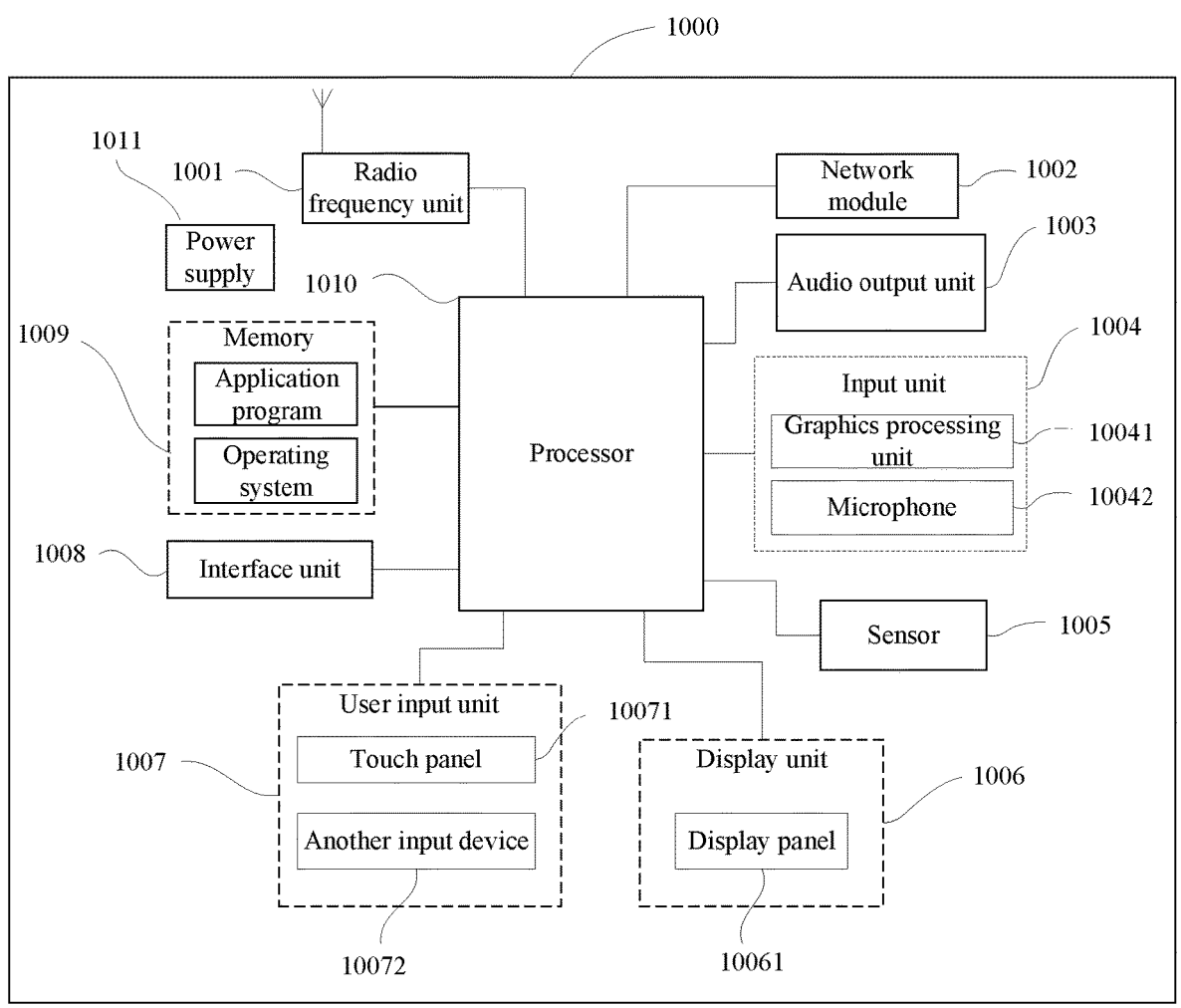
FIG. 10 is a schematic structural diagram of a terminal according to an embodiment of the present disclosure.

The communications device in this embodiment of the present disclosure may be implemented as a terminal. FIG. 10 is a schematic diagram of a hardware structure of a terminal implementing the embodiments of the present disclosure. The terminal 1000 includes but is not limited to: a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that a structure of the terminal shown in FIG. 10 does not constitute a limitation to the terminal, and the terminal may include more or fewer components than those shown in the figure, or some components may be combined, or a different component arrangement may be used. In this embodiment of the present disclosure, the terminal includes but is not limited to a mobile phone, a tablet computer, a notebook computer, a palmtop computer, an in-vehicle terminal, a wearable device, and a pedometer.

The processor 1010 is configured to: when a repetition scheme of a PDSCH in one slot is configured or indicated, determine at least one candidate PDSCH reception occasion based on an SLIV of a TDRA; and determine, based on a first PDSCH scheduled by using DCI and at least one candidate PDSCH reception occasion, a feedback position of an HARQ-ACK corresponding to the first PDSCH in a preset HARQ-ACK codebook, where the first PDSCH is transmitted for one or more times.

In the technical solution in this embodiment of the present disclosure, when the repetition scheme of the PDSCH in one slot is configured or indicated, the at least one candidate PDSCH reception occasion is determined based on the SLIV of the TDRA. The feedback position of the HARQ-ACK corresponding to the first PDSCH in the preset HARQ-ACK codebook is determined based on the first PDSCH scheduled by using the DCI and the at least one candidate PDSCH reception occasion. The first PDSCH is transmitted for one or more times. In this way, in the scenario in which the repetition scheme of the PDSCH in one slot is configured or indicated, the terminal determines the feedback position of the HARQ-ACK corresponding to the first PDSCH in the preset HARQ-ACK codebook by using the foregoing scheme, to feed back the semi-static HARQ-ACK codebook by using the feedback position. A network device determines the feedback position of the HARQ-ACK corresponding to the first PDSCH in the preset HARQ-ACK codebook, to receive the semi-static HARQ-ACK codebook by using the feedback position. In this way, the semi-static HARQ-ACK codebook is applicable to the scenario in which one same PDSCH is transmitted in time domain in one slot for a plurality of times.

It should be understood that in this embodiment of the present disclosure, the radio frequency unit 1001 may be configured to receive and send signals in an information receiving and sending process or a calling process. Specifically, after receiving downlink data from a network device, the radio frequency unit 1001 sends the downlink data to the processor 1010 for processing, and sends uplink data to the network device. Generally, the radio frequency unit 1001 includes but is not limited to, an antenna, at least one amplifier, a transceiver, a coupler, a low noise amplifier, and a duplexer. In addition, the radio frequency unit 1001 may further communicate with a network and another device by using a wireless communications system.

The terminal provides wireless broadband Internet access to a user by using the network module 1002, for example, helps the user receive and send e-mails, browse web pages, access streaming media, and the like.

The audio output unit 1003 may convert audio data received by the radio frequency unit 1001 or the network module 1002 or stored in the memory 1009 into an audio signal, and output the audio signal into sound. In addition, the audio output unit 1003 may further provide an audio output (for example, a call signal received voice, or a message received voice) related to a specific function implemented by the terminal 1000. The audio output unit 1003 includes a loudspeaker, a buzzer, a receiver, and the like.

The input unit 1004 is configured to receive an audio signal or a video signal. The input unit 1004 may include a graphics processing unit (GPU) 10041 and a microphone 10042, and the graphics processing unit 10041 processes image data of a static picture or a video obtained by an image capture apparatus (such as a camera) in a video capture mode or an image capture mode. A processed image frame may be displayed on the display unit 1006. The image frame processed by the graphics processing unit 10041 may be stored in the memory 1009 (or another storage medium) or sent via the radio frequency unit 1001 or the network module 1002. The microphone 10042 may receive a sound and can process such a sound into audio data. The processed audio data may be converted, in a telephone call mode, into a format that may be sent to a mobile communication network device by using the radio frequency unit 1001, and the audio data obtained after conversion is output.

The terminal 1000 further includes at least one sensor 1005, for example, a light sensor, a motion sensor, and another sensor. Specifically, the light sensor includes an ambient light sensor and a proximity sensor. The ambient light sensor may adjust the luminance of the display panel 10061 based on the brightness of ambient light. The proximity sensor may turn off the display panel 10061 and/or backlight when the terminal 1000 is moved to an ear. As a type of the motion sensor, an accelerometer sensor may detect an acceleration value in each direction (generally, on three axes), and detect a value and a direction of gravity when the accelerometer sensor is static, and may be used to recognize a terminal posture (such as landscape and portrait orientation switching, a related game, or magnetometer posture calibration), a function related to vibration recognition (such as a pedometer or a knock), and the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information entered by a user or information provided for a user. The display unit 1006 may include the display panel 10061, and the display panel 10061 may be configured in a form of a liquid crystal display (LCD), an organic light-emitting diode (OLED), or the like.

The user input unit 1007 may be configured to receive input digit or character information and generate key signal input related to user setting and function control of the terminal. Specifically, the user input unit 1007 includes a touch panel 10071 and another input device 10072. The touch panel 10071 is also referred to as a touchscreen, and may collect a touch operation performed by the user on or near the touch panel 10071 (for example, an operation performed on or near the touch panel 10071 by the user by using any appropriate object or accessory such as a finger or a stylus). The touch panel 10071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1010, and receives and executes a command from the processor 1010. In addition, the touch panel 10071 may be implemented by various types, such as a resistive type, a capacitive type, an infrared type, or a surface acoustic wave type. In addition to the touch panel 10071, the user input unit 1007 may further include another input device 10072. Specifically, another input device 10072 may include but is not limited to a physical keyboard, function keys (for example, a volume control key and an on/off key), a trackball, a mouse, and a joystick. Details are not described herein.

Further, the touch panel 10071 may cover the display panel 10061. When detecting a touch operation on or near the touch panel 10071, the touch panel 10071 transmits the touch operation to the processor 1010 to determine a type of a touch event. Then, the processor 1010 provides a corresponding visual output on the display panel 10061 based on the type of the touch event. Although in FIG. 10, the touch panel 10071 and the display panel 10061 are used as two independent components to implement input and output functions of the terminal, in some embodiments, the touch panel 10071 and the display panel 10061 may be integrated to implement the input and output functions of the terminal. This is not specifically limited herein.

The interface unit 1008 is an interface connecting an external apparatus to the terminal 1000. For example, the external apparatus may include a wired or wireless headphone jack, an external power supply (or a battery charger) port, a wired or wireless data port, a memory card port, a port for connecting an apparatus having an identification module, an audio input/output (I/O) port, a video I/O port, a headset jack, and the like. The interface unit 1008 may be configured to receive input (for example, data information and power) from the external apparatus and transmit the received input to one or more elements in the terminal 1000, or may be configured to transmit data between the terminal 1000 and the external apparatus.

The memory 1009 may be configured to store software programs and various data. The memory 1009 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 1009 may include a high-speed random access memory, and may further include a non-volatile memory such as at least one magnetic disk storage device, a flash memory device, or another volatile solid-state storage device.

The processor 1010 is a control center of the terminal, and connects all parts of the entire terminal by using various interfaces and lines. By running or executing a software program and/or a module stored in the memory 1009 and invoking data stored in the memory 1009, the processor 1010 performs various functions of the terminal and data processing, to perform overall monitoring on the terminal. The processor 1010 may include one or more processing units. The processor 1010 may be integrated with an application processor and a modem processor. The application processor mainly processes an operating system, a user interface, an application program, and the like, and the modem processor mainly processes wireless communication. It may be understood that, alternatively, the modem processor may not be integrated into the processor 1010.

The terminal 1000 may further include the power supply 1011 (for example, a battery) configured to supply power to various components. The power supply 1011 may be logically connected to the processor 1010 through a power management system, so as to implement functions such as managing charging, discharging, and power consumption by using the power management system.

In addition, the terminal 1000 includes some functional modules that are not shown. Details are not described herein.

The terminal provided in this embodiment of the present disclosure can implement the processes implemented by the communications device in the HARQ-ACK feedback position determining method embodiment. To avoid repetition, details are not described herein again.

Figure 11:
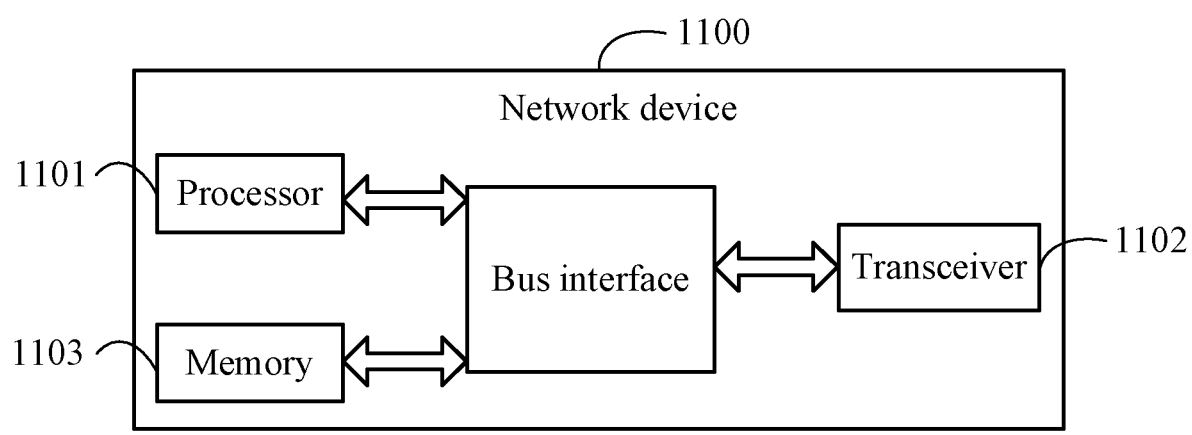
FIG. 11 is a schematic structural diagram of a network device according to an embodiment of the present disclosure.

The communications device in the embodiments of the present disclosure may be implemented as a network device. FIG. 11 is a schematic diagram of a hardware structure of a network device implementing the embodiments of the present disclosure. The network device 1100 includes but is not limited to a processor 1101, a transceiver 1102, a memory 1103, and a bus interface. The processor 1101 is configured to read a program in the memory 1103, to perform the following process:

when a repetition scheme of a PDSCH in one slot is configured or indicated, determining at least one candidate PDSCH reception occasion based on an SLIV of a TDRA; and determining, based on a first PDSCH scheduled by using DCI and the at least one candidate PDSCH reception occasion, a feedback position of an HARQ-ACK corresponding to the first PDSCH in a preset HARQ-ACK codebook, where the first PDSCH is transmitted for one or more times.

In FIG. 11, a bus architecture may include any quantity of interconnected buses and bridges, which are specifically connected together by various circuits of one or more processors represented by the processor 1101 and a memory represented by the memory 1103. The bus architecture may further link various other circuits such as a peripheral device, a voltage regulator, and a power management circuit. These are well known in the art, and therefore are not further described in this specification. The bus interface provides an interface. The transceiver 1102 may be a plurality of elements, in other words, include a transmitter and a receiver, and provide a unit for communicating with various other devices on a transmission medium.

In the technical solution in this embodiment of the present disclosure, when the repetition scheme of the PDSCH in one slot is configured or indicated, the at least one candidate PDSCH reception occasion is determined based on the SLIV of the TDRA. The feedback position of the HARQ-ACK corresponding to the first PDSCH in the preset HARQ-ACK codebook is determined based on the first PDSCH scheduled by using the DCI and the at least one candidate PDSCH reception occasion. The first PDSCH is transmitted for one or more times. In this way, in the scenario in which the repetition scheme of the PDSCH in one slot is configured or indicated, the terminal determines the feedback position of the HARQ-ACK corresponding to the first PDSCH in the preset HARQ-ACK codebook by using the foregoing scheme, to feed back the semi-static HARQ-ACK codebook by using the feedback position. A network device determines the feedback position of the HARQ-ACK corresponding to the first PDSCH in the preset HARQ-ACK codebook, to receive the semi-static HARQ-ACK codebook by using the feedback position. In this way, the semi-static HARQ-ACK codebook is applicable to the scenario in which one same PDSCH is transmitted in time domain in one slot for a plurality of times.

The network device provided in this embodiment of the present disclosure can implement the processes implemented by the communications device in the HARQ-ACK feedback position determining method embodiment. To avoid repetition, details are not described herein again.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described above with reference to the accompanying drawings, but the present disclosure is not limited to the foregoing specific implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A method for determining a feedback position of hybrid automatic repeat request-acknowledgement (HARQ-ACK), comprising:
   when a repetition scheme of a physical downlink shared channel (PDSCH) in one slot is configured or indicated, determining at least one candidate PDSCH reception occasion based on a start and length indicator (SLIV) of a time domain resource allocation (TDRA); and
   determining, based on a first PDSCH scheduled by using downlink control information (DCI) and the at least one candidate PDSCH reception occasion, a feedback position of an HARQ-ACK corresponding to the first PDSCH in a preset HARQ-ACK codebook, wherein the first PDSCH is transmitted for one or more times,
   wherein when the repetition scheme being scheme 2a or scheme 2b, a quantity of phase tracking reference signal (PTRS) ports of a frequency domain resource corresponding to each transmission configuration indicator (TCI) state is 1, a frequency density of the PTRS is a density of a frequency domain resource corresponding to each TCI state, wherein:
   the scheme 2a is that transmission on all resources is performed by using one single coded codeword of a redundancy version (RV); and
   the scheme 2b is that transmission on each non-overlapping frequency domain resource is performed by using one single coded codeword of an RV.

2. The method according to claim 1, wherein one TDRA corresponds to N candidate PDSCH reception occasions; and
   the determining at least one candidate PDSCH reception occasion based on an SLIV of a TDRA comprises:
   determining N SLIVs based on M SLIVs;
   determining N candidate PDSCH reception occasions based on the N SLIVs, wherein
   M represents a largest quantity of times of repeating the PDSCH in a time domain repetition scheme of a PDSCH in one slot, and the M SLIVs are determined based on an SLIV of one TDRA, a quantity of interval symbols between PDSCH repetitions, and a value of M;
   the N SLIVs are some or all of the M SLIVs; and
   M is an integer greater than 1, and N is an integer greater than or equal to 1 and less than or equal to M.

3. The method according to claim 2, wherein the N SLIVs are located in a slot in which the first SLIV in the M SLIVs is located, and N is a largest quantity of SLIVs in the slot in which the first SLIV in the M SLIVs is located.

4. The method according to claim 2, wherein when the HARQ-ACK is fed back by using a granularity of a slot, the determining, based on a first PDSCH scheduled by using DCI and the at least one candidate PDSCH reception occasion, a feedback position of an HARQ-ACK corresponding to the first PDSCH in a preset HARQ-ACK codebook comprises:
   when it is indicated by using the DCI that a quantity of repetition times in time domain is 1, determining that the feedback position is a position, in a first preset HARQ-ACK codebook, of the first candidate PDSCH reception occasion that corresponds to the first SLIV and that is determined by using a target TDRA; or
   when it is indicated by using the DCI that a quantity of repetition times in time domain is K, determining that the feedback position is a position, in a first preset HARQ-ACK codebook, of at least a $k^{th}$ candidate PDSCH reception occasion determined by using a target TDRA, wherein
   the target TDRA is a TDRA corresponding to the first PDSCH, and
   K is an integer greater than 1 and less than or equal to N, and k is an integer greater than or equal to 1 and less than or equal to K.

5. The method according to claim 2, wherein when the HARQ-ACK is fed back by using a granularity of a sub-slot, the determining, based on a first PDSCH scheduled by using DCI and the at least one candidate PDSCH reception occasion, a feedback position of an HARQ-ACK corresponding to the first PDSCH in a preset HARQ-ACK codebook comprises:
   when it is indicated by using the DCI that a quantity of repetition times in time domain is 1, determining that the feedback position is a position, in a second preset HARQ-ACK codebook, of a candidate PDSCH reception occasion that corresponds to the first SLIV and that is determined by using a target TDRA; or
   when it is indicated by using the DCI that a quantity of repetition times in time domain is K, determining that the feedback position is a position, in a second preset HARQ-ACK codebook, of a candidate PDSCH reception occasion that corresponds to a Kth PDSCH repetition and that is determined by using a target TDRA, wherein
   the target TDRA is a TDRA corresponding to the first PDSCH, and
   K is an integer greater than 1 and less than or equal to N.

6. The method according to claim 2, wherein an SLIV occupied by an nth PDSCH repetition is determined by using an SLIV occupied by an $(n-1)^{th}$ PDSCH repetition and a PDSCH repetition interval, wherein
   n is an integer greater than 1 and less than or equal to N.

7. The method according to claim 2, further comprising:
   determining that a position for feeding back a non-acknowledgement (NACK) is a position other than the feedback position in the preset HARQ-ACK codebook.

8. The method according to claim 2, wherein the determining N SLIVs based on M SLIVs comprises:
   when a time domain repetition scheme of a PDSCH in one slot is configured or indicated, determining the N SLIVs based on the M SLIVs.

9. The method according to claim 2, wherein the determining N SLIVs based on M SLIVs comprises:
   when a time domain repetition scheme of a PDSCH in one slot is configured or indicated, and the HARQ-ACK is fed back by using a granularity of a sub-slot, determining the N SLIVs based on the M SLIVs.

10. The method according to claim 1, wherein one TDRA corresponds to one candidate PDSCH reception occasion.

11. The method according to claim 10, wherein the determining, based on a first PDSCH scheduled by using DCI and the at least one candidate PDSCH reception occasion, a feedback position of an HARQ-ACK corresponding to the first PDSCH in a preset HARQ-ACK codebook comprises:
   when it is indicated by using the DCI that a quantity of repetition times in time domain is 1 or K, determining that the feedback position is a position, in the preset HARQ-ACK codebook, of a candidate PDSCH reception occasion determined by using a target TDRA, wherein
   the target TDRA is a TDRA corresponding to the first PDSCH, and
   K is an integer greater than 1 and less than or equal to N.

12. The method according to claim 10, wherein when a frequency domain repetition scheme of a PDSCH in one slot is configured or indicated, one TDRA corresponds to one candidate PDSCH reception occasion.

13. The method according to claim 10, wherein when the HARQ-ACK is fed back by using a granularity of a slot, one TDRA corresponds to one candidate PDSCH reception occasion.

14. A communications device, comprising: a processor, a memory, and a computer program that is stored in the memory and that can be run on the processor, wherein when the computer program is executed by the processor, following steps of the hybrid automatic repeat request-acknowledgement (HARQ-ACK) feedback position determining method are implemented:
  when a repetition scheme of a physical downlink shared channel (PDSCH) in one slot is configured or indicated, determining at least one candidate PDSCH reception occasion based on a start and length indicator (SLIV) of a time domain resource allocation (TDRA); and
  determining, based on a first PDSCH scheduled by using downlink control information (DCI) and the at least one candidate PDSCH reception occasion, a feedback position of an HARQ-ACK corresponding to the first PDSCH in a preset HARQ-ACK codebook, wherein the first PDSCH is transmitted for one or more times,
wherein when the repetition scheme being scheme 2a or scheme 2b, a quantity of phase tracking reference signal (PTRS) ports of a frequency domain resource corresponding to each transmission configuration indicator (TCI) state is 1, a frequency density of the PTRS is a density of a frequency domain resource corresponding to each TCI state, wherein:
  the scheme 2a is that transmission on all resources is performed by using one single coded codeword of a redundancy version (RV); and
  the scheme 2b is that transmission on each non-overlapping frequency domain resource is performed by using one single coded codeword of an RV.

15. The communications device according to claim 14, wherein one TDRA corresponds to N candidate PDSCH reception occasions; and
  the determining at least one candidate PDSCH reception occasion based on an SLIV of a TDRA comprises:
  determining N SLIVs based on M SLIVs;
  determining N candidate PDSCH reception occasions based on the N SLIVs, wherein
  M represents a largest quantity of times of repeating the PDSCH in a time domain repetition scheme of a PDSCH in one slot, and the M SLIVs are determined based on an SLIV of one TDRA, a quantity of interval symbols between PDSCH repetitions, and a value of M;
  the N SLIVs are some or all of the M SLIVs; and
  M is an integer greater than 1, and N is an integer greater than or equal to 1 and less than or equal to M.

16. The communications device according to claim 15, wherein the N SLIVs are located in a slot in which the first SLIV in the M SLIVs is located, and N is a largest quantity of SLIVs in the slot in which the first SLIV in the M SLIVs is located.

17. The communications device according to claim 15, wherein when the HARQ-ACK is fed back by using a granularity of a slot, the determining, based on a first PDSCH scheduled by using DCI and the at least one candidate PDSCH reception occasion, a feedback position of an HARQ-ACK corresponding to the first PDSCH in a preset HARQ-ACK codebook comprises:
  when it is indicated by using the DCI that a quantity of repetition times in time domain is 1, determining that the feedback position is a position, in a first preset HARQ-ACK codebook, of the first candidate PDSCH reception occasion that corresponds to the first SLIV and that is determined by using a target TDRA; or
  when it is indicated by using the DCI that a quantity of repetition times in time domain is K, determining that the feedback position is a position, in a first preset HARQ-ACK codebook, of at least a $k^{th}$ candidate PDSCH reception occasion determined by using a target TDRA, wherein
  the target TDRA is a TDRA corresponding to the first PDSCH, and
  K is an integer greater than 1 and less than or equal to N, and k is an integer greater than or equal to 1 and less than or equal to K.

18. A non-transitory computer-readable storage medium, storing a computer program, wherein when the computer program is executed by a processor, following steps of the hybrid automatic repeat request-acknowledgement (HARQ-ACK) feedback position determining method are implemented:
  when a repetition scheme of a physical downlink shared channel (PDSCH) in one slot is configured or indicated, determining at least one candidate PDSCH reception occasion based on a start and length indicator (SLIV) of a time domain resource allocation (TDRA); and
  determining, based on a first PDSCH scheduled by using downlink control information (DCI) and the at least one candidate PDSCH reception occasion, a feedback position of an HARQ-ACK corresponding to the first PDSCH in a preset HARQ-ACK codebook, wherein the first PDSCH is transmitted for one or more times,
wherein when the repetition scheme being scheme 2a or scheme 2b, a quantity of phase tracking reference signal (PTRS) ports of a frequency domain resource corresponding to each transmission configuration indicator (TCI) state is 1, a frequency density of the PTRS is a density of a frequency domain resource corresponding to each TCI state, wherein:
  the scheme 2a is that transmission on all resources is performed by using one single coded codeword of a redundancy version (RV); and
  the scheme 2b is that transmission on each non-overlapping frequency domain resource is performed by using one single coded codeword of an RV.

* * * * *